(12) United States Patent
Lundblad

(10) Patent No.: US 8,367,261 B2
(45) Date of Patent: Feb. 5, 2013

(54) FUEL CELL DEVICE AND METHOD OF OPERATING THE SAME

(75) Inventor: Anders Lundblad, Stockholm (SE)

(73) Assignee: MYFC AB, Stockholm (SE)

(*) Notice: Subject to any disclaimer, the term of this patent is extended or adjusted under 35 U.S.C. 154(b) by 0 days.

(21) Appl. No.: 13/307,450

(22) Filed: Nov. 30, 2011

(65) Prior Publication Data

US 2012/0114980 A1 May 10, 2012

Related U.S. Application Data

(63) Continuation of application No. PCT/SE2010/050637, filed on Jun. 9, 2010.

(51) Int. Cl.
*H01M 8/04* (2006.01)
(52) U.S. Cl. .................... 429/429; 429/441
(58) Field of Classification Search .......... 429/410, 429/429, 441
See application file for complete search history.

(56) References Cited

U.S. PATENT DOCUMENTS

| | | | |
|---|---|---|---|
| 6,127,056 A * | 10/2000 | Wheeler et al. | 429/429 |
| 8,007,946 B2 * | 8/2011 | Alp et al. | 429/429 |
| 8,148,024 B2 * | 4/2012 | Korytnikov | 429/429 |
| 2007/0154749 A1 | 7/2007 | Kato et al. | |
| 2007/0259229 A1 | 11/2007 | Tung et al. | |

FOREIGN PATENT DOCUMENTS

| WO | WO 03/061040 A1 | 7/2003 |
|---|---|---|
| WO | WO 2006/022134 A2 | 3/2006 |

OTHER PUBLICATIONS

F.A. de Bruijn, et al., "Review: Durability and Degradation Issues of PEM Fuel Cell Components," *Fuel Cells* 08, 2008, No. 1, pp. 3-22 (20 pages).
Wolfgang Schmittinger, et al., "A review of the main parameters influencing long-term performance and durability of PEM fuel cells," *Journal of Power Sources* 180 (2008), pp. 1-14 (14 pages).
International Search Report mailed Sep. 21, 2010 issued in a related PCT International Application No. PCT/SE2010/050637 (3 pages).

* cited by examiner

*Primary Examiner* — Stephen J. Kalafut
(74) *Attorney, Agent, or Firm* — Robert P. Michal; Lucas & Mercanti, LLP

(57) ABSTRACT

Fuel cell device comprising a fuel cell assembly with at least one polymer electrolyte membrane fuel cell and a fuel delivery means for providing a fuel flow. The device is provided with means for pre burning adapted to burn fuel entering the fuel cell assembly during the start up phase until the fuel flow is increased to a predetermined level and/or the oxygen concentration is decreased to a predetermined level. A method of operating the assembly comprises the steps of initiating the start up phase by causing the fuel delivery means to deliver a fuel flow, whereby a means for pre burning burns off fuel entering the fuel cell assembly, monitoring the fuel flow and/or the oxygen concentration and when the fuel flow is increased to a predetermined level and/or the oxygen concentration is decreased to a predetermined.

15 Claims, 6 Drawing Sheets

FUEL CELL DEVICE AND METHOD OF OPERATING THE SAME

CROSS-REFERENCE TO RELATED APPLICATION

Figure 1:
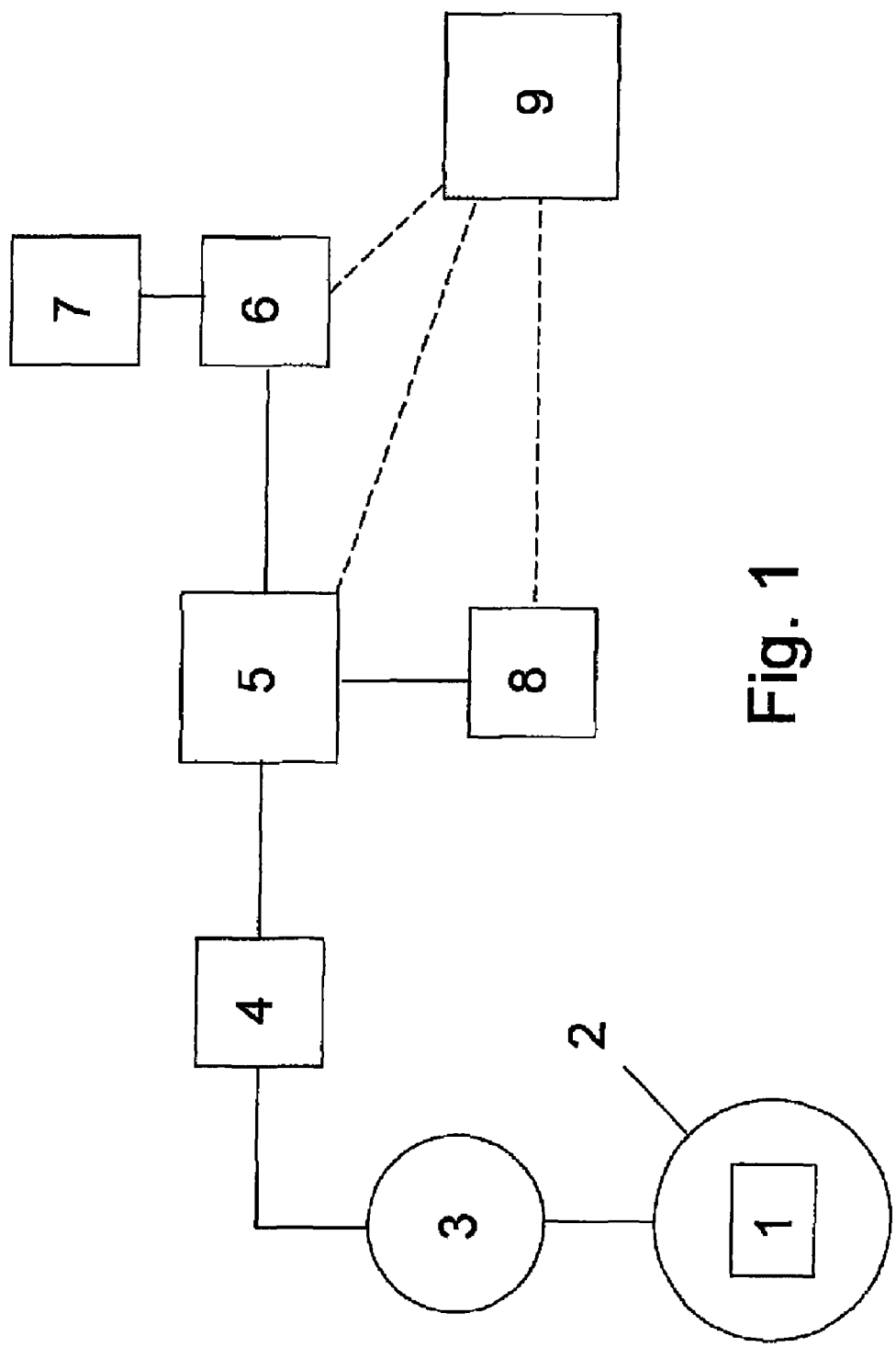

This is a Continuation of PCT International Application PCT/SE2010/050637 filed Jun. 9, 2010, which in turn claims benefit to Swedish Patent Applications No. SE 0900781-6 filed Jun. 9, 2009 and No. SE 0951012-4 filed Dec. 22, 2009, the entire disclosure of each of which is incorporated herein by reference.

FIELD OF THE INVENTION

The present invention relates to operation of a fuel cell device.

BACKGROUND OF THE INVENTION

Fuel cells can be used for powering and/or charging of electronic devices among other applications, which are well known in the prior art. The typical power level for fuel cells used as such power sources is 0.1 to 50 W. A commonly used fuel in this type of fuel cells is hydrogen.

The PEM (Polymer Electrolyte Membrane or Proton Exchange Membrane) fuel cell is one common type of fuel cell. However, such fuel cells are sensitive to high cell voltages, since the lifetime of the cells is negatively affected thereby. High cell voltages leads to carbon corrosion, catalyst dissolution and ionomer degradation. It is therefore desirable to avoid high cell voltages as much as possible. Furthermore, the mixture of $O_2$ (oxygen) and $H_2$ (hydrogen) in the anode compartment has shown to further decrease the lifetime of the MEA (Membrane Electrode Assembly). See reference 1) Review: Durability and Degradation Issues of PEM Fuel Cell Components, F. A. de Bruijn, V. A. T. Dam, and G. J. M. Janssen, Fuel Cells 08, 2008, 1, 3-22, and reference 2) A review of the main parameters influencing long-term performance and durability of PEM fuel cells, Wolfgang Schmittinger, Ardalan Vahidi, Journal of Power Sources, 2008, 180, 1-14.

It is therefore desirable to shorten the time when both hydrogen and oxygen are present in the hydrogen compartment. Furthermore, it is believed that a mixture of hydrogen and oxygen gases in the anode compartment is less detrimental for the MEA if the cell voltage is lowered by e.g. short circuiting the cell. Thus, the time the cells are left at open circuit potential and the time the cells are exposed to a mixture of $O_2$ and $H_2$ should be minimised.

SUMMARY OF THE INVENTION

In view of the problems presented above in the background, the object of the invention is to improve the life-time of fuel cells by a novel design of the fuel cell assembly and by a novel start up procedure.

The above-mentioned object is achieved by the present invention in a first aspect by a fuel cell device as defined in claim 1.

Thus, there is provided a fuel cell device comprising a fuel cell assembly with at least one polymer electrolyte membrane fuel cell, a fuel delivery means for providing a fuel flow.

The novel and inventive feature is that the device is provided with means for pre burning. This pre burning means is adapted to burn fuel that enters the fuel cell assembly during start up, i.e. before the device begins to deliver power, and to continue to burn until the fuel flow is increased to a predetermined level and/or the oxygen concentration is decreased to a predetermined level.

In this way detrimental levels of hydrogen and oxygen mixture is eliminated.

In a second aspect the invention provides a method of operating a fuel cell device defined in claim 8.

This method comprises initiating the start up by causing the fuel delivery means to deliver a fuel flow. Then, the means for pre burning is caused to burn off fuel entering the fuel cell assembly. The fuel flow and/or the oxygen concentration is monitored. When the fuel flow is increased to a predetermined level and/or the oxygen concentration is decreased to a predetermined level, switching from start up, during which no power is delivered, to power generation.

Preferred embodiments are set forth in the dependent claims.

SHORT DESCRIPTION OF THE APPENDED DRAWINGS

The following Figs. show a fuel cell powered power source according to the invention.

Figure 2:
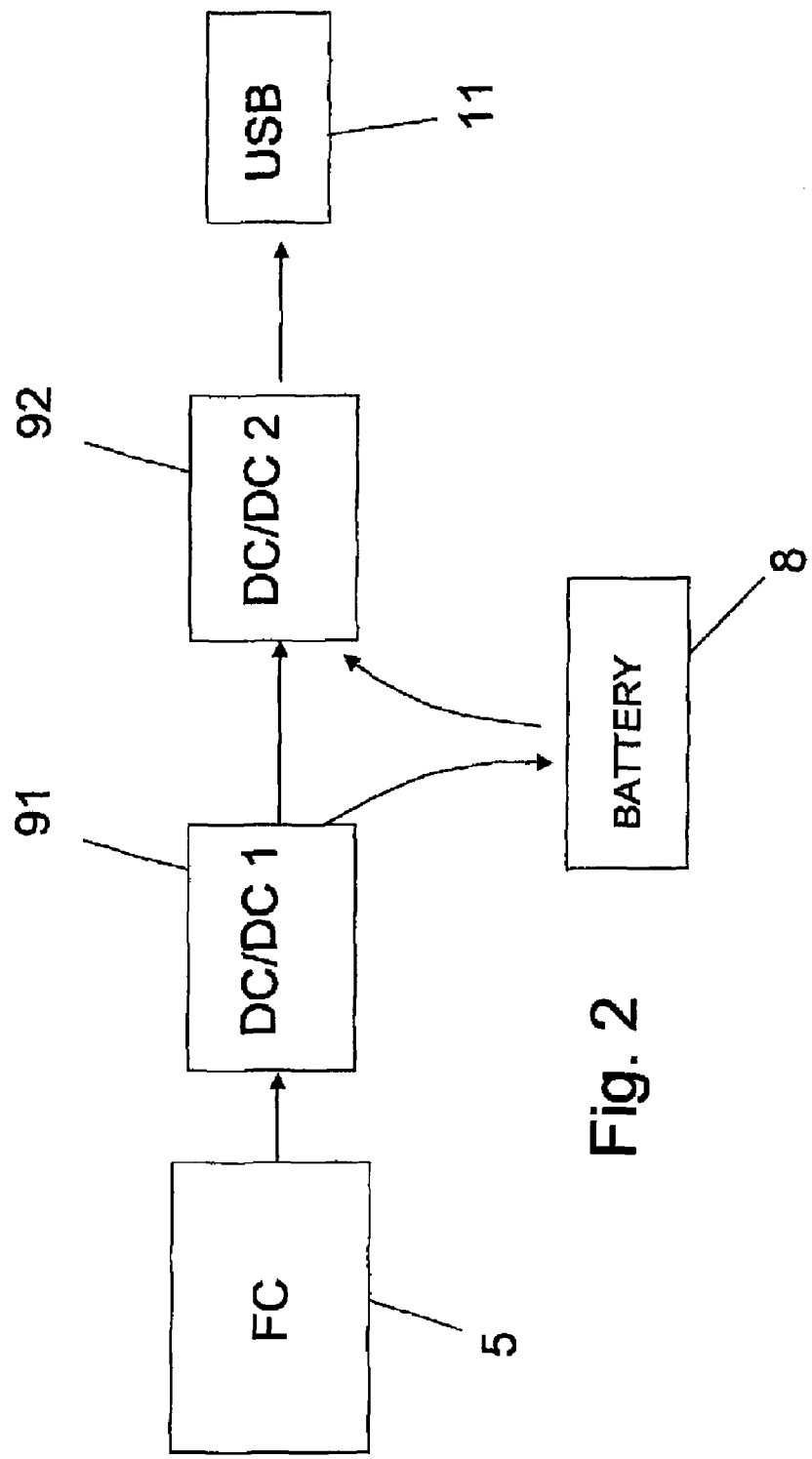
Figure 3A:
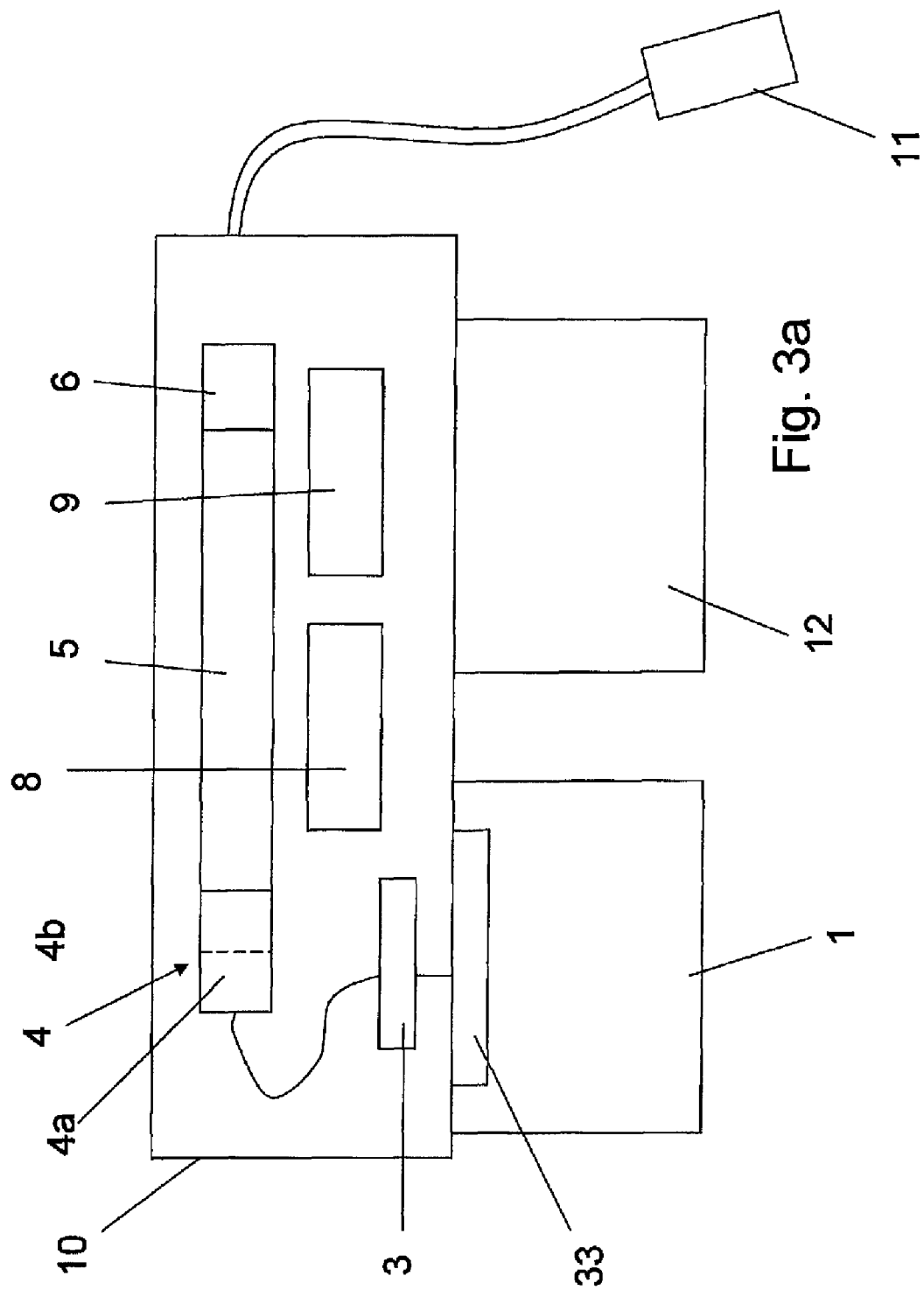
Figure 3B:
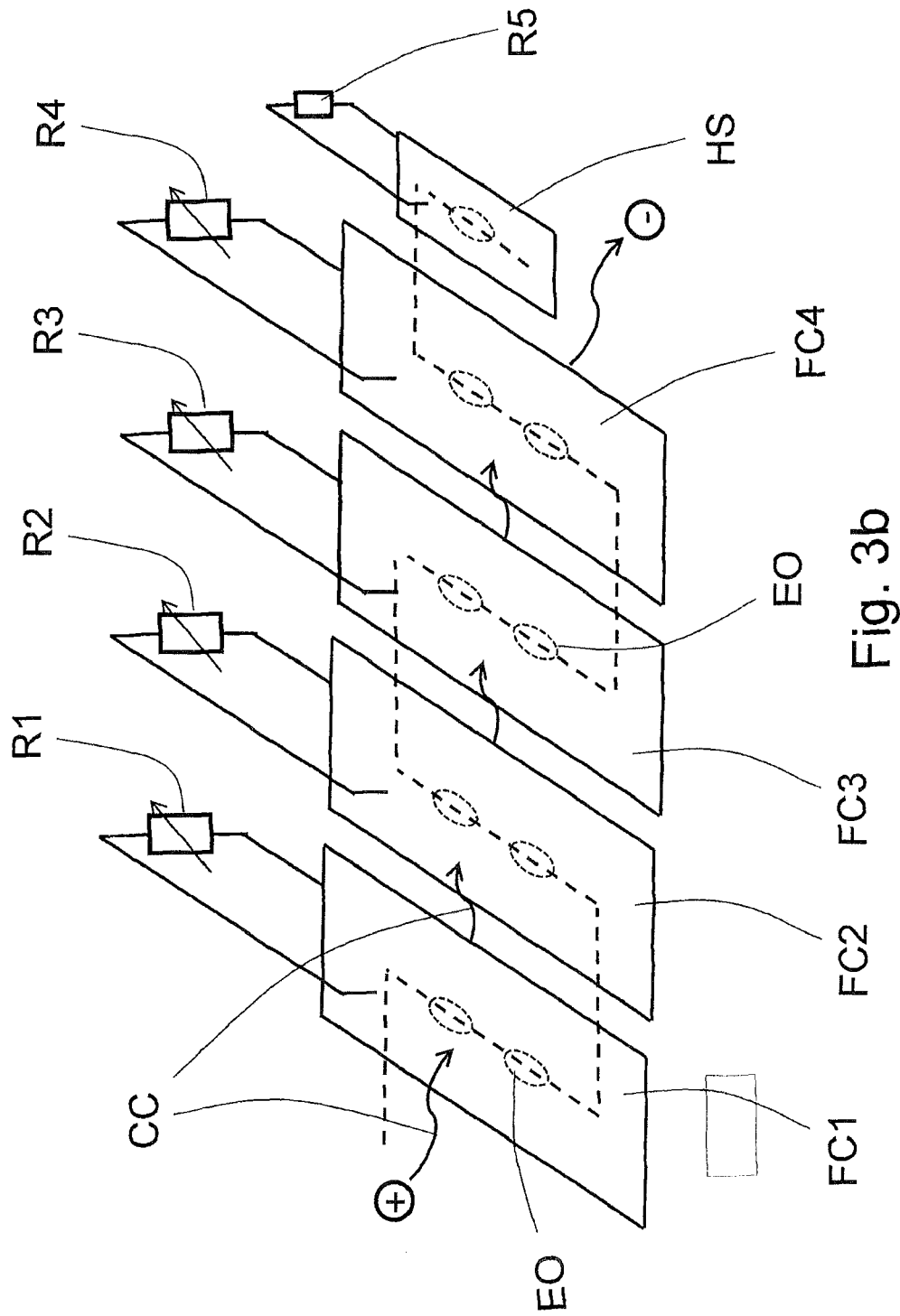
Figure 4:
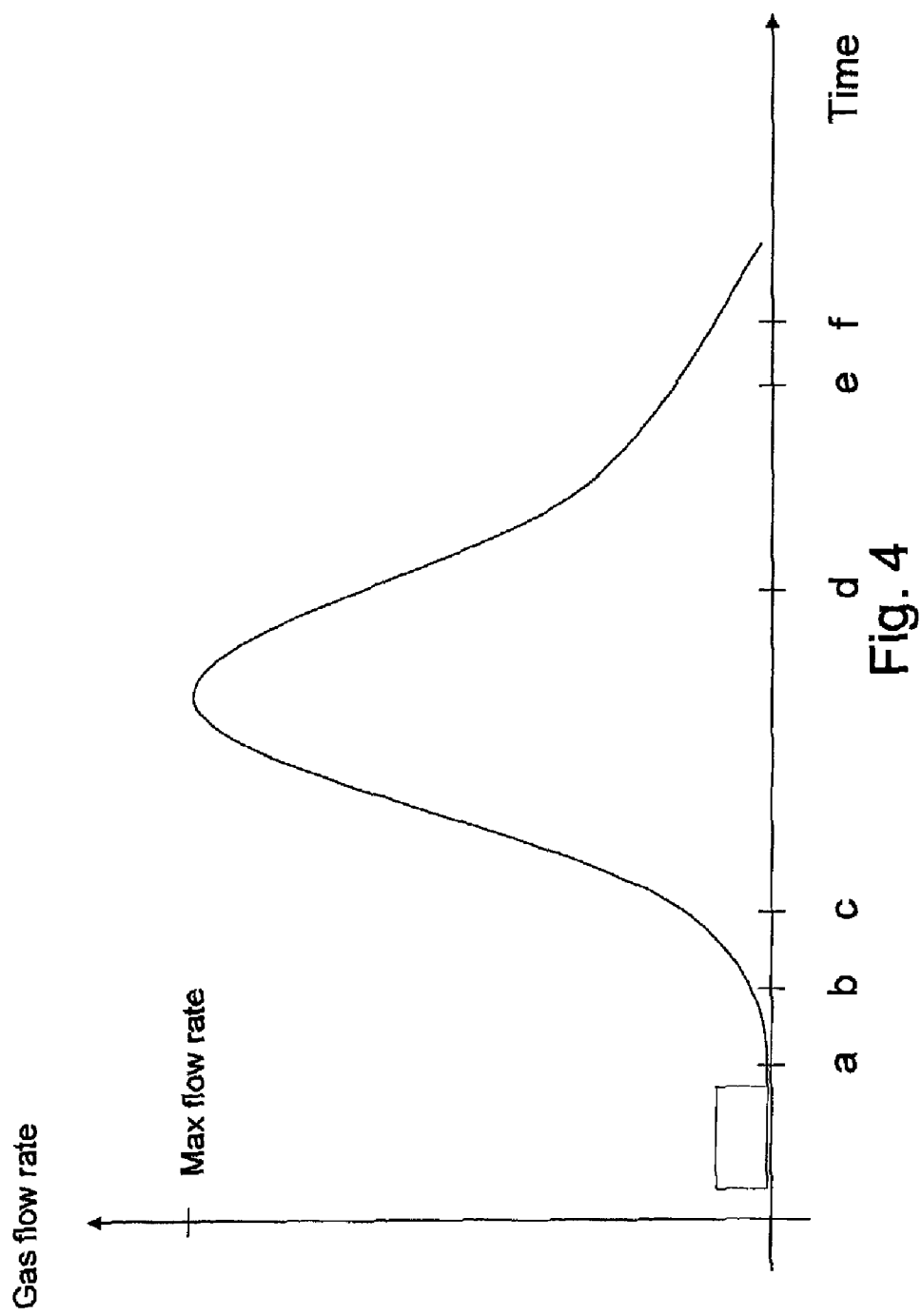
Figure 5:
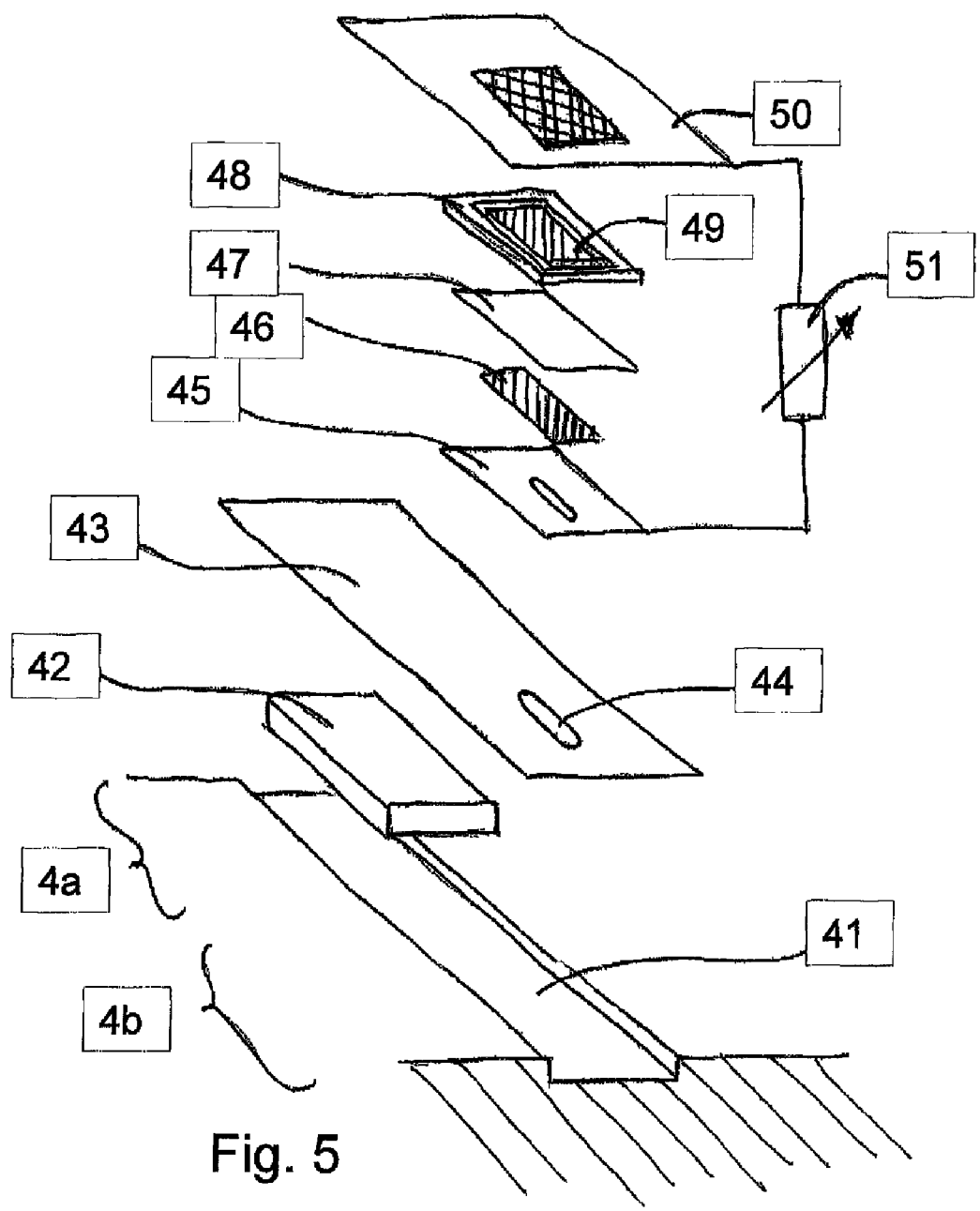

FIG. 1 is a schematic drawing of the components in the fuel cell powered power source, FIG. 2 is a schematic drawing of the power management electronics in the fuel cell powered power source, FIG. 3a is a cross section of the fuel cell powered power source with its components inside having a cylindrical fuel cup/reactor, FIG. 3b is a schematic figure of a 4-cell planar fuel cell assembly with each cell connected to a variable resistor, FIG. 4 shows a curve of the hydrogen flow versus time for a fuel cell powered power source according to the invention, and FIG. 5 is a schematically exploded drawing of a means for pre burning.

DETAILED DESCRIPTION OF PREFERRED EMBODIMENTS OF THE INVENTION

When reference is made to the expression "burning" in this application it is meant consumption of hydrogen by an electrochemical combustion or a non-electrochemical combustion reaction.

One embodiment of a fuel cell powered power source according to the present invention schematically illustrated in FIG. 1 comprises the following components. A fuel source, preferably a hydrogen generator container 1, a mechanism 2 for locking and closing of the hydrogen generator container, a filter or membrane 3 that is fuel gas permeable and that can be hydrophobic, a means 4 for pre burning, a fuel cell assembly 5, a sensor cell 6 and a pressure release valve 7. In the Fig. is also shown a battery 8 and an electronic control circuit 9 for controlling the power drawn from the fuel cell assembly 5 and the power output from the device 10.

FIG. 2 schematically shows the power electronics of the electronic circuit 9 in the fuel cell device 10. In order to regulate the voltage output from the device 10 the fuel cell assembly 5 is connected to a first DC to DC converter 91 and subsequently to a second DC to DC converter 92 as depicted in FIG. 2. The power output from the second DC to DC converter 92 and from the entire fuel cell device 10 is fed to an USB connector 11. The battery 8 is connected to the DC to DC converters 91 and 92. Thus, when required the battery 8 will be charged by the first DC to DC converter 91 and the battery 8 is also able of supplying power to the second DC to DC converter 92.

Now the rationale behind the invention will be described in general terms.

During start up of a fuel cell device 10, as described above with reference to FIGS. 1 and 2, there will be a mixture of $H_2$ and air coming from the hydrogen generating container 1, because there is some air inside the hydrogen generating container 1 before the hydrogen generating reaction begins. Furthermore, there is air present in the gas channels and anode GDL (gas diffusion layers) of the fuel cell assembly 5. Also this air volume must be rinsed out or reacted with during the start up.

In order to reduce the time that the fuel cell is exposed to a mixture of $H_2$ and air a pre burning of the mixture is performed according to the invention before the cells in the fuel cell assembly are activated to generate power.

To bring about such pre burning a number of options exists according to the invention. Generically we refer to a means for pre burning for this function. This means for pre burning can be selected from one of the following:
1) A non-electrochemical device which suitably is a catalytic device.
2) An electrochemical device, suitably a small dedicated fuel cell arranged before the power generating fuel cell assembly.
3) A combination of 1) and 2)
4) One of (preferably the first) or all cells in the power generating fuel cell assembly can be set to perform a pre burning operation by short circuiting.

Other options not mentioned in the above non-exhaustive list are of course equally possible and within the inventive idea.

In a first embodiment a dedicated device is provided as the means 4 for pre burning. As indicated it may be an electrochemical or a non-electrochemical device. The latter is preferably a catalytic device.

If the means for pre burning is non-electrochemical the oxygen and hydrogen mixture coming from the reaction chamber will react and form water before reaching the power generating fuel cell assembly 5. The non-electrochemical means 4 for pre burning is suitably a catalytic device (i.e. a surface with a catalyst thereon) positioned in a gas flow channel before the electrochemical part of the fuel cell assembly 5. This catalytic device may e.g. comprise a porous material (e.g. porous graphite) positioned in the gas channel so that the gas flow is forced through it. On the surface of the porous material there is a catalyst deposited (e.g. Pt particles). The means 4 for pre burning should preferably be in good thermal contact with the other components of the fuel cell device, e.g. the housing around the fuel cell device 10, so that it is not overheated. This means 4 for pre burning will be passive in the sense that its operation will be determined by the composition of the incoming gas, i.e. when all oxygen in the incoming gas has been flushed out there will be no more reaction in the means for pre burning, since one of the reactants ($O_2$) is missing.

In its most simplified usage, the preburner comprises only a non-electrochemical means. The startup events could then proceed according to the following sequence:
1) charging the hydrogen generating container 1 with the fuel cartridge and the water, and locking it to the device 10 thereby initiating the hydrogen generation,
2) slow generation of hydrogen leading to a mixture of hydrogen and air (with oxygen therein) being transferred to the non-electrochemical preburner 4a and being automatically reacted with water,
3) after a period of time all air inside the hydrogen generator container has been rinsed out and all the cells in the fuel cell assembly reaches more than 0.75 V/cell, then the fuel cell assembly is connected to the load.

If the means for pre burning is electrochemical the hydrogen in the hydrogen and air mixture is consumed. The consumption of the hydrogen leads to that no hydrogen is fed to the power generating fuel cells until it has reached a higher flow level. The higher flow level is defined as a level at which the system has reached a threshold current which is determined by measuring the voltage over the short circuiting resistor of the means for pre burning.

The electrochemical means 4 for pre burning is preferably a fuel cell with the hydrogen electrode facing the gas channel and the cathode in contact with ambient air. This electrochemical fuel cell could for example be built in the same way as the power generating cells of the fuel cell assembly 5. But with the difference that it is provided with means for short circuiting over a resistor and it is positioned separately in the gas flow channel before the power generating cells of the fuel cell assembly 5.

In a still further embodiment a combination of a non-electrochemical and electrochemical part to be used as means 4 for pre burning and subsequently positioned in the gas flow channel.

The functional features of the fuel cell powered power source according to the present invention will be described in the following with reference to FIG. 3a. In FIG. 3a most of the components from FIG. 1 are shown as well as a fuel cell device 10, an USB connector 11 and a container for extra fuel pouches 12. The device 10 comprises a fuel cell assembly 5 and a preburner means 4. In FIG. 3a the preburner 4 is shown as a combination of two parts, a non-electrochemical and an electrochemical part 4a and 4b, respectively. This represents only an embodiment, since the device can also comprise these parts alone, i.e. the preburner can either be electrochemical or non-electrochemical (catalytic). This will be described more in detail with reference to FIG. 5.

The output of the fuel cell assembly 5 is solely determined by the hydrogen flow from a hydrogen generator container 1. It is therefore important that the hydrogen flow is not higher than what the fuel cell assembly 5 is able to consume. During start up, i.e. before power generation begins, there will be a rinsing phase to get the fuel cell assembly 5 up and running, during which phase the air present in the hydrogen generator container and in the fuel cell assembly will be rinsed out.

During power generation the fuel cell device 10 will be working in "hybrid operation". By hybrid operation is meant that the battery 8 is supplying power to the second DC to DC converter 92 (see FIG. 2) if the power demand is higher than what the fuel cell assembly 5 is able to deliver. On the other hand a fuel cell assembly 5 will charge the battery 8 if the power demand is smaller than what the fuel cell assembly 5 delivers. When the battery 8 runs empty the fuel cell device 10 goes into internal charging operation.

The fuel cell device 10 uses a fuel pellet, or "teabag" like permeable pouch containing fuel material, disposed in a hydrogen generating container. Optionally it should be possible to open the hydrogen generating container and change the fuel pellet while operating, thus using only the battery 8 when the fuel cell device 10 is not in operation. The design life-time for one pellet/pouch in the fuel cell device 10 may vary, but is typically around 1 hour. At the end of the this life-time of the fuel pellet the shutdown/decrease of hydrogen flow should be as fast as possible in order to minimize the amount of hydrogen gas being wasted.

The hydrogen generator can work at ambient pressure conditions and at slightly pressurized conditions (up to 1 bar). Preferably there are no other contaminants than water vapour coming into the fuel cell from the hydrogen generator. Furthermore, there is a filter 3 (e.g. hydrophobic) hindering liquid water from entering the fuel cell assembly even when the reaction chamber is tilted and liquid water is in direct contact with the filter 3. A safety valve, such as a pressure release valve is used in order to hinder the pressure inside the hydrogen generator container 1 to rise. This may happen if the gas outlet channel is blocked, which might occur when the fuel cell device 10 is turned upside down.

The hydrogen generator suitable for this fuel cell device 10 is typically based on a water hydrolysis process. Such chemical processes could typically be a water solution reacting with a metal (e.g. Al, Zn, Fe) or a metal alloy (e.g. LixAly) or a chemical hydride or other chemical components that form hydrogen by reaction with water. In order to enhance or control the reaction in the generator the pH of the water solution may be adjusted.

For this type of hydrogen generator typically a fuel pellet or a fuel tablet or a fuel provided in a permeable bag is placed in a container 1 filled with water in order to start the water hydrolysis process. The pellet/bag containing the hydrogen generating material will start to generate hydrogen via a hydrolysis reaction. Alternatively, a cartridge is provided having a compound therein which is capable of evolving hydrogen when it is brought in contact with water. Thus, when it is desired to draw power from the unit, water is added to the cartridge.

In the above described embodiment the preburner 4 is a dedicated device arranged in the fuel flow path before the power cells. However, there are other possible solutions as well.

FIG. 3b is a schematic illustration of a 4-cell planar fuel cell assembly with each cell FC1, FC2, FC3, FC4 connected to a variable resistor R1, R2, R3 and R4, respectively. Thus, each resistor can suitably be set to high or low resistance. The arrows represent the current collectors CC and the current flow from plus to minus pole. Dotted lines represent the hydrogen gas flow channel which is placed underneath the cells. From the channels there are elongated openings EO to each anode compartment. At the outlet end there is a hydrogen sensor HS, i.e. corresponding to the sensor cell 6 shown in FIG. 1. In this case it is a small fuel cell which is short circuited over a resistor R5.

The hydrogen flow versus time will typically follow the curve illustrated in FIG. 4. This means that the hydrogen generation starts at a low rate and increases to a maximum level and then decreases again. A typical time-span for a curve in FIG. 4, (i.e. b-f) is from a few minutes to several hours. The typical flow rate extends over a range from 0 to a maximum of 500 ml/min. Typically for a fuel cell of nominally 2.5 W the flow rate maximum should be 25-40 ml/min, suitably around 30 ml/min.

FIG. 5 is a schematically exploded drawing of such a combination embodiment of the means 4 for pre burning, which is placed in a segment of a gas flow channel 41 before the fuel cell assembly 5, having a combination of a non-electrochemical part 4a and an electrochemical part 4b. A porous catalyst bed 42 is placed in the gas channel 41 and is completely filling its cross-section. On top of the channel 41 is a lid 43 sealing the gas channel 41. On top of the lid 43 the electrochemical part 4b acting as the means for pre burning is placed. The electrochemical part 4b is in contact with the gas channel through a recess 44. The fuel cell consists of a current collector foil 45 (e.g. Sn coated Cu foil) coated with adhesive on selected areas on both sides, an anode GDL 46, a MEA 47, a frame 48 made of a porous compressible material, a cathode GDL 49 and a clamping plate and current collector 50 on top. The top current collector is short circuited over a variable resistor and/or switch 51.

In still another embodiment of the invention the means 4 for pre burning is implemented as one of the power generating cells in the fuel cell assembly 5, preferably the cell closest to the gas inlet. In this embodiment the cell is provided with a resistor for short circuiting the cell. During start up and for performing a pre burning function, the fuel cell is short circuited over a constant or variable resistor in the fuel cell assembly 5. This is controlled by the electronic control circuit 9 and is referred to as the stand-by mode.

In another embodiment more than one or all cells in the assembly 5 are individually short circuited, thus functioning as means 4 for pre burning.

The hydrogen generator should preferably have a relative short start up time, e.g. 1 to 2 minutes is preferred. Further, the hydrogen flow from the hydrogen generator should preferably reach a plateau and stay there and this plateau should be independent of the temperature of the reaction.

The outlet of the hydrogen generator container 1 must be sealed so that all the generated hydrogen is transferred to the fuel cell assembly 5. Therefore, the hydrogen generator container 1 has a locking and closing mechanism 2. Furthermore, there may be a locking mechanism which ensures that the hydrogen generator container 1 is attached to the fuel cell device 10 in a safe and secured fashion.

In order to avoid liquid water from the hydrogen generator container 1 to enter the fuel cell assembly 5 there is a filter or membrane 3, which is fuel gas permeable and which may be hydrophobic. It is positioned between the hydrogen generator container 1 and the fuel cell assembly 5 as is shown in FIG. 3. Inside the reaction chamber may also be a hydrophobic pre filter 33.

As mentioned in the background, PEM fuel cells are sensitive to the presence of an oxygen and hydrogen mixture in the hydrogen compartment, and in particular during start up before the system has reached a steady state such detrimental mixtures of oxygen and hydrogen occur in the hydrogen compartment. Therefore, there is provided means for preventing the detrimental oxygen/hydrogen mixtures to occur, which is referred to as means 4 for pre burning. Also mentioned in the background of the invention is that it is desirable to shorten the time when both hydrogen and oxygen is present in the hydrogen compartment. The reaction rate will be low initially and increase to a maximum and then decrease to a low value again. A flow versus time diagram is illustrated in FIG. 4.

Typically the power output from the fuel cell device 10 described herein is 0.1 to 50 W, preferably 1 to 10 W. The fuel cell assembly 5 could provide all the maximum power of the device, but since the device may function in hybrid mode the fuel cell assembly 5 may be designed to provide considerably less power than the maximum power of the fuel cell device 10.

The fuel cell assembly 5 is typically of a passive planar type where the cells are placed next to each other in an array. The gas flow inside the fuel cell assembly 5 may be series connected or parallel connected or a combination thereof. Series connected means that the fuel gas is led from one cell to another and the flow of hydrogen is successively reduced as hydrogen is consumed by the cells in the array. Parallel connected means that the fuel gas is shared by the cells in the array so that the fuel is fed to the cells in parallel.

The sensor cell 6, the principle of which is disclosed in applicants own co-pending international application PCT/

SE2008/05032, may be used together with the fuel cells of the fuel cell assembly 5 in order to adjust the power drawn from the fuel cell assembly 5, so that the power drawn corresponds to the fuel gas flow.

Optionally there may be a pressure release valve 7 positioned at the outlet of the fuel cell device 10. This pressure release valve 7 may for instance be of an umbrella type. The pressure release valve controls that there is a certain overpressure maintained inside the fuel gas system (typically 1 to 5 Psi).

The battery 8 is required for the fuel cell device 10 to be in a stand-by state. If the fuel cell device 10 is in hybrid operation the battery 8 should be of sufficient size, so that it can support the fuel cell efficiently.

As an alternative to a battery a so called supercapacitor can be used.

The method of operation during start up of the fuel cell device 10, where the means 4 for pre burning is a non-electrochemical part 4a placed before an electrochemical part 4b in the gas channel, will be described in the following. The operation is based on having a fuel gas supply which is determined by a hydrolysis reaction of a fuel pellet, a fuel tablet or fuel provided in a permeable bag or any other cartridge generating hydrogen by hydrolysis reaction. During start up the gas coming from the reaction chamber is a mixture of oxygen containing air and hydrogen. In the non-electrochemical part 4a the oxygen and hydrogen mixture will react and form water. When all oxygen in the reaction chamber has been flushed out there will be no more reaction. The electrochemical part 4b of the means 4 for pre burning will be in use when hydrogen is present in the gas flow but the total gas flow still is too low for normal operation. The voltage of the electrochemical part will increase until it reaches a threshold, e.g. 100 mV. When this happens the gas is considered to be essentially oxygen free. The electrochemical part is then released, i.e. it is no longer short circuited. However, it should be noted that an electrode as the electrochemical part 4b is a three dimensional catalytic surface where $O_2$ and $H_2$ can also react in a non-electrochemical way.

The method of operation during start up for the non-electrochemical part as described above for a combination of a non-electrochemical and an electrochemical part is also applicable on a sole non-electrochemical pre-burner.

Start Up Phase

A method of operation will now be described. Before the start up phase the electronic circuit 9 is always in a stand-by state. In the stand-by state the electrochemical part 4b is short circuited. The non-electrochemical part 4a is always in stand-by state because of its inherent design. When the voltage of the means 4 for pre burning has reached a certain level, e.g. 10 to 50 mV or even higher, the fuel cell device 10 is initiated whereby the electronic circuit 9 is triggered. This happens somewhere between a and b in FIG. 4. In this method of operation, before the start up phase, an indicator light is turned on.

When the voltage of the means 4 for pre burning has reached the region of 50 to 200 mV (somewhere between b and c in FIG. 4) and the inlet gas is considered to be essentially free of oxygen, the electrochemical part 4b is switched off. The sensor cell 6 will now indicate "high" and the fuel cell device 10 is now set on for charging of the internal battery. The indicator light is still turned on.

Another method of operation in the start up phase is based on having all cells in the fuel cell assembly 5 individually short circuited, i.e. acting as means for pre burning, when the device 10 is in stand-by state (for the consumer the fuel cell device is experienced as turned off). With short circuiting is meant that each individual cell is short circuited over a resistor of typically 0.5 to 5 Ohm for a fuel cell of about 4 $cm^2$.

In the start up phase the device 10 will be initiated when the voltage of the first cell (cell closest to fuel generator container 1) is higher than a threshold value (e.g. 50 mV). The indicator light will be turned on. When the voltage of the first cell has increased to a second threshold value (e.g. 75 mV), the short circuiting of the first cell is released and the first cell will go to open circuit potential. Now the second cell is going to reach the second threshold value and subsequently the short circuiting of it will be released. This will continue until the short circuiting of all cells are released and at open circuit potential. The sensor cell 6 will now indicate "high" and the fuel cell device 10 is now set on for charging of the internal battery. Start up light is still turned on.

Power Generating Phase

When the current of the fuel cell assembly 5, as indicated by a current indicator (e.g. a shunt resistor), is higher than a threshold value of 100 to 300 mA. The fuel cell assembly 5 is subject to an activation procedure (the activation procedure is a successive short-circuiting of the cells in the assembly thereby increasing the current density of each cell for a short period) and thereafter the power output of the fuel cell device 10 is switched on. The running light is turned on. The fuel cell device 10 is charging and is operating in hybrid operation where the battery 8 is working either as a power dump or as extra power depending on the fuel supply and the power demand. If battery voltage runs low the fuel cell device 10 goes into internal charging, i.e. the power output goes down and the fuel cell device 10 is charging the battery 8.

If fuel supply is interrupted e.g. by opening of the hydrogen generating container 1 of the hydrogen generator, the fuel cell assembly 5 is shut down but the power output remains switched on for a certain time (e.g. 2 to 20 minutes) or until the battery 8 has become discharged, thus, allowing the user to insert new fuel tablets and restart the fuel cell assembly 5. The hydrogen supply could typically be interrupted because the fuel pellet is being emptied and the hydrogen gas flow has decreased.

When the current of the fuel cell assembly 5, as indicated by current indicator, is below a threshold value of 10 to 100 mA, preferably 30 to 70 mA (between e and f on the curve in FIG. 4), the power generation of the fuel cell assembly 5 is turned off. The electrochemical part 4b of the means 4 for pre burning is now activated in order to be stand-by for operation again.

The present invention is not limited to the above-described preferred embodiments. Various alternatives, modifications and equivalents may be used. Therefore, the above embodiments should not be taken as limiting the scope of the invention, which is defined by the appending claims.

The invention claimed is:

1. A fuel cell device comprising a fuel cell assembly with at least one polymer electrolyte membrane fuel cell, and a hydrogen delivery means for providing a hydrogen flow, wherein the device is provided with means for pre burning adapted to burn fuel in a fuel and oxygen mixture entering the fuel cell assembly on an anode side until at least one of the fuel flow is increased to a predetermined level and the oxygen concentration in said mixture is decreased to a predetermined level.

2. The device as claimed in claim 1, wherein the device comprises means for switching to power generation when said predetermined level(s) have been reached.

3. The device as claimed in claim 1, further comprising an electronic control circuit for controlling the operation of the device.

4. The device as claimed in claim 1, wherein the means for pre-burning is selected from a catalytic device and a dedicated fuel cell.

5. The device as claimed in claim 4, wherein the means for pre-burning is a catalytic device and comprises a porous material on the surface of which there is provided a catalytic material.

6. The device as claimed in claim 4, wherein the means for pre-burning is a fuel cell and comprises a resistor short-circuiting the cell.

7. The device as claimed in claim 1, wherein the means for pre-burning comprises at least one of the fuel cells in the fuel cell assembly and wherein the electronic circuitry is adapted to switch the operation of said fuel cell(s) from pre burning to power burning when said predetermined level(s) have been reached.

8. A method of operating a fuel cell device, the fuel cell device comprising a fuel cell assembly with at least one polymer electrolyte membrane fuel cell, a fuel delivery means for providing a fuel flow, the device being operable in two phases, a first start up phase and a second power generating phase, the method comprising the steps of: initiating the start up phase by causing the fuel delivery means to deliver a fuel flow, whereby a means for pre-burning burns off fuel entering the fuel cell assembly; and when at least one of the fuel flow is increased to a predetermined level and the oxygen concentration is decreased to a predetermined level, switching from start up phase to power generating phase.

9. The method as claimed in claim 8, further comprising at least one of monitoring the fuel flow and the oxygen concentration.

10. The method as claimed in claim 8, wherein the means for pre-burning is a dedicated fuel cell provided before the fuel cell assembly, and the monitoring of the levels is performed by measuring the voltage of said dedicated fuel cell.

11. The method as claimed in claim 8, wherein the means for pre-burning is one or more of the fuel cells in the fuel cell assembly and the monitoring of the levels is performed by measuring the voltage of a cell in said fuel cell assembly.

12. The device as claimed in claim 2, further comprising an electronic control circuit for controlling the operation of the device.

13. The device as claimed in claim 2, wherein the means for pre-burning is selected from a catalytic device and a dedicated fuel cell.

14. The device as claimed in claim 3, wherein the means for pre-burning is selected from a catalytic device and a dedicated fuel cell.

15. The method as claimed in claim 9, wherein the means for pre-burning is a dedicated fuel cell provided before the fuel cell assembly, and the monitoring of the levels is performed by measuring the voltage of said dedicated fuel cell.

* * * * *